Patented Aug. 7, 1923.

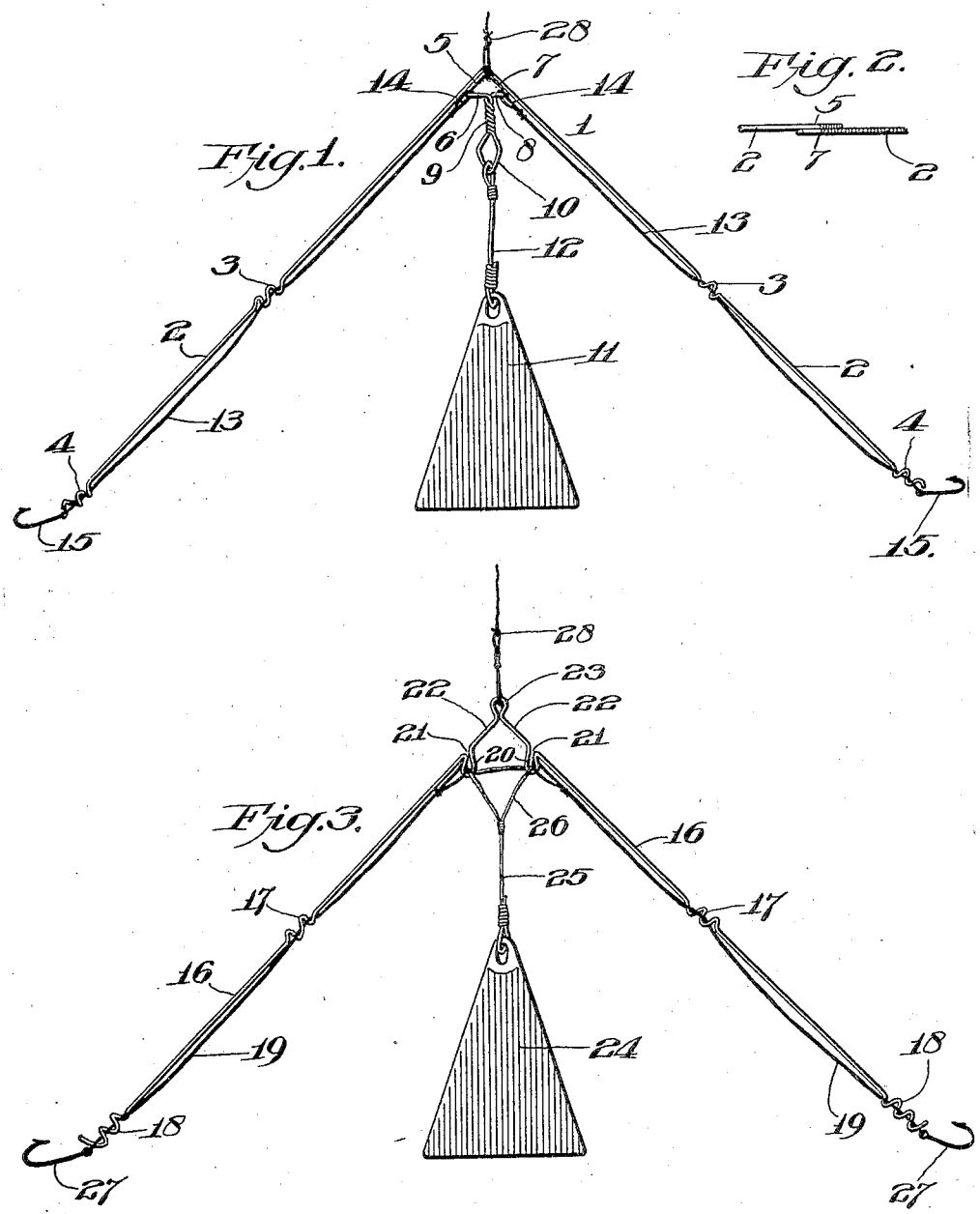

1,464,163

UNITED STATES PATENT OFFICE.

DAVID ABERNETHY, OF PHILADELPHIA, PENNSYLVANIA.

SPREADER FOR FISHING LINES.

Application filed February 11, 1922. Serial No. 535,785.

*To all whom it may concern:*

Be it known that I, DAVID ABERNETHY, a citizen of the United States, residing in the city and county of Philadelphia, State of Pennsylvania, have invented a new and useful Spreader for Fishing Lines, of which the following is a specification.

My invention relates to spreaders for fishing lines, and comprehends a novel construction and arrangement of spreader whereby the baited hooks will be held on the bottom of a water-way irrespective of the swiftness of the tide or the calmness of the still water, the dipsey being of such weight and connected to the spreader in such a manner that it will hold down the legs of the spreader to the bottom of the water way so that a plurality of hooks are in proper position for catching fish which are bottom feeders, such as for example sea bass, croakers, porgies, flounders, and the like.

My novel construction of spreader is also adapted to be connected with the line so that it will be at any desired distance above the bottom of the water-way, so that it can be used when the fisherman desires to fish for those type of fish which swim above the bottom, for example, weak fish, thus taking the place of a long leader.

With the above and other objects in view which will hereinafter more clearly appear, my invention comprehends a novel construction of spreader which is preferably formed from a simple piece of material, such as for example, wire.

It further comprehends a novel construction of a spreader of angular formation having means to receive the cord which carries the dipsey and having its leg portions coiled and deflected upon themselves for a desired distance in order to retain the snell of the hook in proper posititon.

Other novel features of construction and advantage will hereinafter appear in the detailed description and the appended claims.

For the purpose of illustrating my invention, I have shown in the accompanying drawings, typical embodiments thereof which are at present preferred by me, since they will give in practice satisfactory and reliable results. It is to be understood, however, that the various instrumentalities of which my invention consists can be variously arranged and organized and that my invention is not limited to the precise arrangement and organization of these instrumentalities as herein shown and described.

Figure 1 represents in front elevation a spreader for fishing lines embodying my invention.

Figure 2 represents a top plan view of a portion of Figure 1.

Figure 3 represents in front elevation another form of spreader embodying my invention.

Similar numerals of reference indicate corresponding parts.

Referring to the drawings, 1 designates a spreader for fishing lines embodying my invention. The spreader is preferably made from an integral piece of material, such as for example wire of the proper gauge, which will not oxidize.

The spreader is provided with legs 2 which are angularly disposed with respect to each other, and intermediate their ends they are preferably coiled or deflected upon themselves as at 3, and in a similar manner the lower ends of the legs 2 are coiled upon themselves as at 4. One leg 2 is at its upper end downwardly deflected as at 5 and then laterally as at 6. In a similar manner the other leg 2 at its upper end is downwardly deflected as at 7 and then laterally as at 8, the two wires being twisted as at 9 and terminating in a loop 10 to which the dipsey 11 is attached by means of the cord 12.

The line 28 is attached as shown in Figures 1 and 3 to the apex portion of the angle so that when the hook is taken by a fish the pull will be in a straight line along one leg of the angle to the fishing line.

13 designates the shell of the ordinary hook, the loops 14 of which are retained in the corner formed by the portions 5 and 6, and 7 and 8 respectively, the hooks 15 being disposed below the lower ends of the legs 2, as will be understood by reference to Figure 1.

The snell 13 is threaded into the loops 3 and 4 by simply winding it therein in the well-known manner.

In the embodiment seen in Figure 3, the general construction and function is the same, the spreader being provided with legs 16 angularly disposed with respect to each other and coiled intermediate their ends as at 17 and at their lower ends as at 18 in order to receive the snell 19,—the ends of which are received in the loops 20 formed near the upper ends of the legs 16, and these loops have their inlets restricted as seen at 21. The legs then converge towards each other as at 22, terminating in the closed loop 23.

The dipsey 24 is connected by means of the cord 25, which is provided with a loop 26 which is received in the loop 20 of the legs.

When it is desired to secure the hooks with respect to the spreader in the embodiment seen in Figure 1, all that it is necessary to do is to slide the loops 14 up the legs 2 of the spreader until they come into the position seen in Figure 1, and thereafter the snell 13 is wound into the coil 3 and the coil 4 of a leg so that it is disposed as seen in Figure 1.

In a similar manner, the hook is attached in the embodiment seen in Figure 3, the loops being slid up until they come into the position seen in Figure 3, and the snell is then threaded into the coils 17 and 18 respectively.

My present invention has in practice marked advantages over any of the types of spreaders now on the market with which I am familiar, since the hooks are retained in close proximity to the bottom so that there is a better chance of catching bottom feeding fish than is possible with the ordinary type of spreader, since in the ordinary type of spreader, the baited hooks usually float upwardly a considerable distance above the bottom.

It will be seen that the point of attachment of the dipsey is preferably at the same place or below the point of attachment of the loop of the snells of the hooks, and is preferably in all cases below the point of attachment of the line to the spreader.

The legs are preferably coiled only at their lower ends and intermediate their lengths, since I have found that sea-grass is less liable to be retained on the legs than if they are coiled throughout their entire lengths, but it will of course be apparent that if desired these coils may extend the full length of the legs, in which case the snells will be retained in closer proximity to such legs.

It will now be apparent that I have devised a novel and useful spreader for fishing lines, which embodies the features of advantage enumerated as desirable in the statement of the invention and the above description, and while I have, in the present instance, shown and described preferred embodiments thereof which will give in practice satisfactory and reliable results; it is to be understood that such embodiments are susceptible of modification in various particulars without departing from the spirit or scope of the invention or sacrificing any of its advantages.

Having thus described my invention, what I claim as new and desire to secure by Letters Patent, is:—

1. A spreader for fishing lines, comprising a single strip of material shaped to angle formation, the legs of the angle having coils to receive the snells of the hooks, the strip at the apex of the angle being bent to triangular formation to receive the snell loops and forming line attaching means, and the integral strip extending downwardly from the triangular formation between the legs to form dipsey attaching means below the point of attachment of the fishing line.

2. A spreader for fishing lines, comprising a single piece of material bent to angle formation and deflected at the free ends of the legs to receive the hooks, the strip at the apex of the angle being twisted upon itself and deflected downwardly between the legs to form means to receive a dipsey, and the apex of the angle being adapted to receive the fishing line.

3. A spreader for fishing lines, comprising a single strip of material shaped to angle formation, the legs of the angle having means to receive the attaching portions of the hooks, the apex portion of the angle being deflected to receive a fishing line, whereby when a hook is taken by a fish the pull will be in substantially a direct line and said strip at the apex portion of the angle below the point of attachment of the fishing line being deflected to form dipsey attaching means.

DAVID ABERNETHY.

Witnesses:
C. D. McVay,
M. E. Byrne.